C. R. ROSS.
SAFETY STEERING MECHANISM.
APPLICATION FILED APR. 12, 1915.
1,182,211.
Patented May 9, 1916.
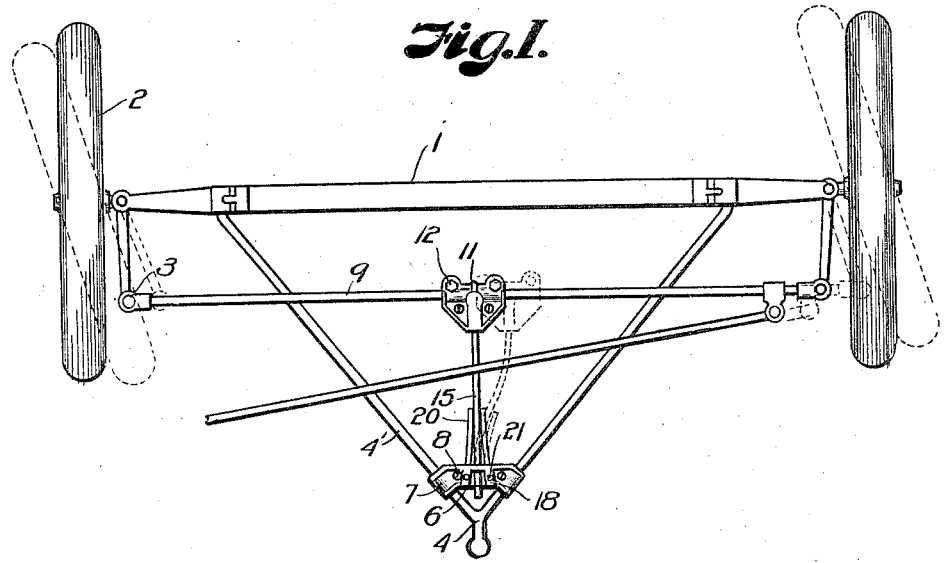
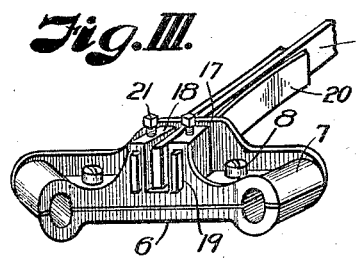
INVENTOR
Charles R. Ross.
BY
Arthur C. Brown.
ATTORNEY

UNITED STATES PATENT OFFICE.

CHARLES R. ROSS, OF KANSAS CITY, MISSOURI, ASSIGNOR OF ONE-THIRD TO G. A. KUHN, ONE-THIRD TO H. A. ROSS, AND ONE-THIRD TO GEO. A. PORTER AND ANNA MOORE OBERLEE, ALL OF KANSAS CITY, MISSOURI.

SAFETY STEERING MECHANISM.

1,182,211.  Specification of Letters Patent. Patented May 9, 1916.

Application filed April 12, 1915. Serial No. 20,713.

*To all whom it may concern:*

Be it known that I, CHARLES R. ROSS, a citizen of the United States, residing at Kansas City, in the county of Jackson and State of Missouri, have invented certain new and useful Improvements in Safety Steering Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to safety steering mechanism for motor driven vehicles, and more particularly to a device for automatically retaining the steering wheels of a vehicle in a straight line position and for returning the same to such position when the wheels have been turned by an operator, or by unevenness in a roadway over which the vehicle is driven.

In accomplishing this object I have provided details of structure, the preferred forms of which are illustrated in the accompanying drawings, wherein:—

Figure I is a plan view of the front axle and steering parts of a motor driven vehicle equipped with my improvements. Fig. II is an enlarged longitudinal section through the safety steering mechanism. Fig. III is an enlarged detail perspective of one of the mounting brackets for the spring member of the mechanism.

Referring more in detail to the drawings: 1 designates the front axle, 2 the front steering wheels and 3 the knuckle steering mechanism of any well known type of motor driven vehicles; the present form of vehicles being equipped with what is commonly known as a wishbone 4 that connects the front axle with the motor casing to form a brace for the axle.

Fixed to the wishbone, adjacent the head thereof, is a bracket 6, comprising split collars 7 that are fixed to the rods 4', and clamped rigidly thereto by screws 8, in order to hold the bracket rigidly in place, and fixed to the connecting rod 9 of the knuckle steering mechanism is a bracket 11 which is also split to receive the rod and clamped by screws 12. The forward end of the bracket 11 contains a socket 14 which is formed in the split members of the bracket, and fixed in said socket is a rearwardly projecting leaf spring 15; the forward end of which is rigidly secured within the socket when the bracket members are mounted on the rod, and the rear end of which projects loosely through a slot 16 in the front wall 17 of the bracket 6, so that it may slide in the slot above the body of the last named bracket.

Projecting rearwardly from the wall 17, above the body of the bracket, are spaced heads 18, having slots 19 opening through the front wall 17 and containing short leaf springs 20; the slots being arranged at an angle so that the springs tend to converge along the main spring 15 and bear against the sides thereof. The springs 20 are held in adjusted position within the heads 18 by screws 21 that are mounted in the heads and bear against the upper edges of the springs 20.

In using the device, presuming the parts to be constructed and assembled as described, when the front wheels are in a straight line position, the leaf spring 15 is straight, as illustrated in Fig. I, with its rear end projecting to its maximum limit through the bracket slot 16. When the wheels are turned out of the straight line position, however, when the connecting rod 9 is moved laterally, the movement of the connecting rod carries the bracket 11 to one side and flexes the main spring 15; the flexing of the spring tending to draw the free rear end thereof through the bracket slot, and bending the secondary spring 20 at the side toward which the connecting rod is moved. As soon, however, as the lateral tension induced by actuation of the car steering mechanism, or by contact of the steering wheels with an unevenness in the road, is released, the main spring will straighten and thereby draw the connecting rod back until the wheels are returned to their straight line or normal position.

It is apparent that while it is necessary for the main spring 15 to have relatively free sliding travel in the slot and its bracket 6, there might be a tendency of the main spring to pivot in the slot during the initial portion of the lateral movement of the connecting rod, so that there would be no resistance exerted by the spring. This possibility is, however, overcome by the auxiliary springs 20, as being mounted on the immovable bracket any lateral movement of the spring whatever will be resisted by them, so that resistance of some kind is exerted for even the slightest movement of the main spring. It is also apparent that should the spring remain the same length between the brackets for all movements of the connecting rod, the tension for a maximum movement of the rod would greatly exceed the tension for a minimum movement. By reason of the sliding mounting of the spring in the bracket 6, however, the active length of the spring 15 is increasingly extended when the connecting rod is moved laterally, so that while the main spring is increasingly flexed its length is increased proportionately so that the resistance remains substantially the same for any position of the connecting rod.

Having thus described my invention, what I claim as new therein, and desire to secure by Letters-Patent, is:

1. The combination with a connecting rod, of a leaf spring fixed to the connecting rod, means for anchoring the spring to induce resistance thereof under lateral movement of the connecting rod in either direction, and auxiliary means for exerting a yielding tension on the leaf spring.

2. In a motor driven vehicle, the combination with knuckle steering and anchoring members, of a leaf spring fixed to one of said members and slidably connected with the other, whereby lateral movement of the rod in either direction is yieldingly resisted, and auxiliary means on the anchoring member for exerting a yielding resistance on said spring.

3. The combination with an anchoring member and a connecting rod, of a leaf spring fixed to the connecting rod and slidably connected with the anchoring member, and auxiliary springs on the anchoring member and engaging opposite sides of the first named spring.

4. The combination with an anchoring member and a connecting rod, of a leaf spring fixed to the connecting rod and slidably mounted in the anchoring member, and leaf springs adjustably mounted in the anchoring member and bearing against opposite sides of the main spring.

5. The combination with an anchoring member, having a slotted wall, and comprising heads having slots opening through the wall at a forwardly converging angle, a connecting rod, a leaf spring fixed to the connecting rod and slidably projected through the slot of the bracket wall, leaf springs fixed in the head slots and bearing against opposite sides of the main spring, and means for fixing the auxiliary springs in said heads.

In testimony whereof I affix my signature in presence of two witnesses.

CHARLES R. ROSS.